Feb. 28, 1956  H. BRIER  2,736,620
POSITIVE PRESSURE JOURNAL BEARING
Filed March 26, 1953
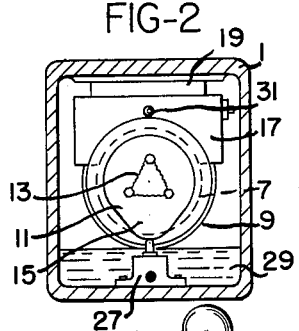
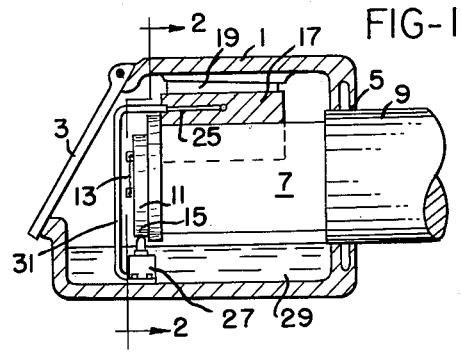
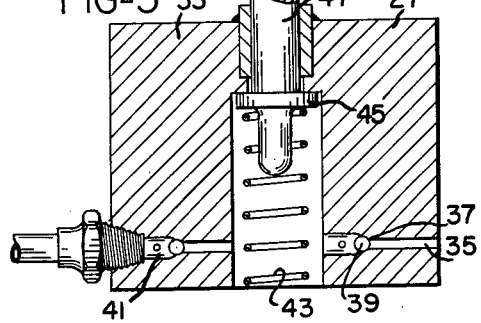
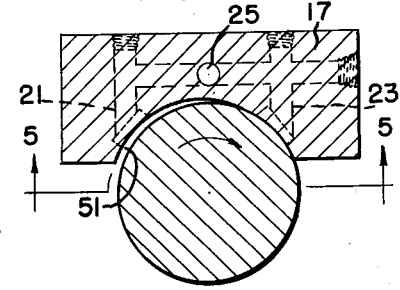
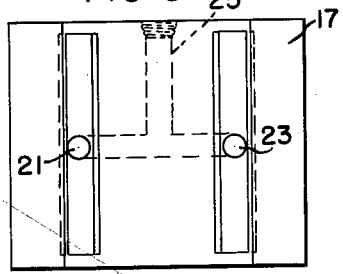
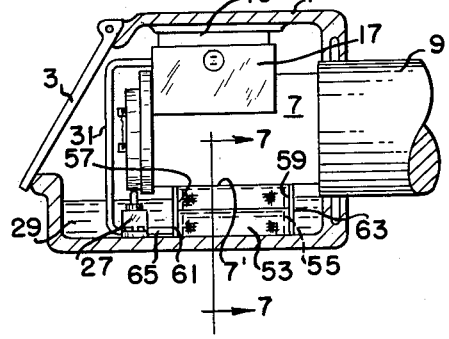
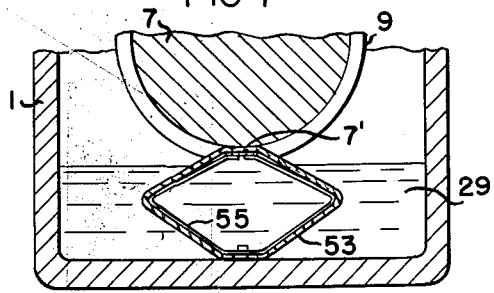
INVENTOR.
HYMAN BRIER
BY *Toulmin & Toulmin*
ATTORNEYS

United States Patent Office 2,736,620
Patented Feb. 28, 1956

2,736,620

POSITIVE PRESSURE JOURNAL BEARING

Hyman Brier, Dayton, Ohio, assignor to The Commonwealth Engineering Company of Ohio, Dayton, Ohio, a corporation of Ohio Application March 26, 1953, Serial No. 344,818

4 Claims. (Cl. 308—84)

This invention relates to the lubrication of shafting and more particularly to the lubrication of the journal bearing structures of heavy transportation equipment such as railroad cars.

The bearings in use on freight cars, for example, have as fundamental requirements that they (1) be of a low cost construction, (2) have a high degree of dependability, and (3) do not necessitate excessive maintenance. Presently such bearings are of a single shoe type and are waste-lubricated; that is the lubricant is provided by a lubricated pad arrangement from which the lubricant is drawn in operation. Such a method of lubrication suffers from several primary disadvantages; it necessarily induces a high coefficient of starting friction and the coefficient of running friction is greater than is desirable; these factors lead to "hot boxes," bearing failures and not infrequently accidents which are expensive in the matter of repairs and loss of service. Also the structural arrangement tends to build up heat within the pad which further induces the failures.

It is a principal object of this invention to provide a novel journal bearing structure in which the lubricant is fed to the bearing surface under a positive pressure.

It is a primary object of this invention to describe a method for providing a copious flow of lubricant to a journal bearing structure.

It is a further object of this invention to describe a structural arrangement of a journal bearing which assists in the dissipation of heat generated at the bearing surface which effect reduces the running temperature of the bearing.

It is another object of this invention to provide a novel structure for lubrication of the bearing which structure effects filtering of the oil before passage of the same to the bearing.

The above and other allied objectives are attained generally speaking by providing within a bearing housing a bearing shoe apertured to permit passage of a liquid lubricant to the rotatable shaft of the structure; the housing contains a supply of lubricant within which there is a pump actuable from the shaft itself; the outlet of the pump is suitably connected to the bearing shoe and provides the lubricant thereto upon actuation by the shaft.

As a further feature of the invention the housing may also contain a novel pad arrangement which contacts the rotatable shaft and is constantly supplied with lubricant as a safety measure.

The invention will be more fully understood by reference to the following detailed description and accompanying drawings wherein:

Figure 1 is a view partially in section of one embodiment of the structure of invention;

Figure 2 is a view taken on line 2—2 of Figure 1;

Figure 3 is a sectional view illustrating a pump useful in the embodiment of the invention shown in Figure 1;

Figure 4 is a side elevational view partially in section illustrating the bearing shoe and shaft arrangement;

Figure 5 is a view taken on line 5—5 of Figure 4;

Figure 6 is a view partly in section illustrating a further embodiment of the invention; and Figure 7 is a view taken on line 7—7 of Figure 6.

Referring to Figures 1 and 2 there is shown at 1 a housing having a closure member 3 for engagement with the housing in liquid tight relation; the housing 1 is further provided with an aperture 5 through which a journal portion 7 of a rotatable shaft 9 passes.

The journal portion 7 is provided preferably at an end thereof with a cam 11 secured by screws and a lock wire 13; cam 11 as shown in Figure 1 is provided with a single lobe 15 but where such is considered desirable a plurality of lobes may be utilized.

A bearing shoe 17 whose vertical position is adjusted by a wedge 19 engages the journal portion 7. As shown more clearly in Figures 4 and 5 the bearing shoe 17 is provided with passages 21, 23, 25. Passages 21, 23 as shown open onto the journal portion 7.

Positioned in the bottom of the housing below the cam 11 is a plunger pump 27 shown in detail in Figure 3. Surrounding the pump is a body of a liquid lubricant 29 which extends over the pump and just below the level of the rotatable shaft. A conduit 31 connects the outward side of the pump 27 to the passage 25 of the bearing shoe 17.

As shown in Figure 3 the pump 27 comprises a casing 33 and includes an inlet 35 having a seat 37 against which a ball valve 39 is adapted to rest. A similar outlet valve is provided at 41. Positioned between the inlet and outlet valve is a spring 43 secured to a collar 45 and adapted to be actuated by a plunger 47. As will be clear actuation of the plunger occasions the drawing of oil from the oil body 29 to the inlet of the pump on the upstroke of the plunger as the oil is forced through the outlet on the downstroke of the same.

In operation the rotation of the shaft 9 and journal portion 7 actuates the cam 11 which moves the plunger 47 rectilineally to actuate the flow of oil from the pump 27 to passage 25 of the bearing shoe 17. The oil entering the passage 25 flows under pressure to passages 21, 23 and exudes onto the journal portion 7 thus thoroughly lubricating the same.

It is to be noted in connection with the operation of the shaft that in one direction of rotation a closely fitted journal is shifted with respect to one aperture of the bearing shoe as indicated at 51 in Figure 4; thus more of the oil will flow through the passage 21 due to the larger clearance between the shoe and shaft when the shaft is rotating in the direction indicated by the arrow and the rotation of the shaft will serve to carry the oil into the higher pressure area 22. The area adjacent to passage 23 will then tend to act as a hydrostatic bearing due to the action of the oil pressure exerted on the journal. When the direction of rotation is reversed, that is opposite to that shown in Figure 4, the passage 23 will convey most of the oil through the bearing shoe to the journal, and thence to high pressure area 20, while the passage 21 will serve as a hydrostatic bearing.

Note also that the structure provides relief from abnormally high pressures. Should such an abnormal pressure occur, it will act through passages 21 and 23 to separate the journal and bearing vertically; the increased clearance occasioned thereby will allow the oil to flow freely through the said passages concurrent with a decrease in pressure, such that an equilibrium is reached between oil pressure and load on the bearing.

In the embodiment of the invention shown in Figures 6 and 7, there is provided in addition to the structure already set forth with respect to Figure 1 a diamond-shaped woolen sleeve 53 having thereon a spring 55 which maintains the sleeve in contact with the lower edge of the journal 7'. The sleeve is closed at the opposed ends 57, 59 thereof with oil-resistant pads 61, 63 of neoprene and a conduit 65 passes from the interior of the pad to provide continuously filtered oil to the inlet 35 of the pump 27. Since the pad is itself in contact with the body of oil liquid as well as with the shaft it further provides a safety feature in that upon failure of the pump the woolen sleeve through its action will continue to supply a film of oil to the bearing.

It will be understood that this invention is susceptible to modification in order to adopt it to different usages and conditions and accordingly, it is desired to comprehend such modifications within this invention as may fall within the scope of the appended claims.

I claim:

1. In a structure which includes a bearing housing and a shaft journaled therein, a bearing shoe having apertures, the shoe being supported against the shaft, means to supply a lubricant to the shaft through the apertures of the shoe, hollow sleeve filter means bearing against the shaft and capable of receiving lubricant therein, and means connected with the said filter means to return the fluid lubricant to the supply means.

2. In combination, a shaft, a reservoir of a lubricant, a closed hollow sleeve of oil permeable material bearing against the shaft to lubricate the shaft and positioned in the reservoir, a pump in the reservoir, passage means connecting the pump to the sleeve to permit the flow of lubricant from the sleeve to the pump, and connecting means between the pump and shaft for the flow of lubricant therebetween.

3. In a structure which includes a bearing housing and a shaft journaled therein, a bearing shoe having apertures, the shoe being supported against the shaft, means to supply a lubricant to the shaft through the apertures of the shoe, hollow sleeve filter means arranged longitudinally of said shaft bearing thereagainst and capable of receiving lubricant therein, the filter means comprising a diamond shaped woolen sleeve, and means connected with the said filter means to return the fluid lubricant to the supply means.

4. In a structure which includes a bearing housing and a shaft journaled therein, a bearing shoe having apertures, the shoe being supported against the shaft, means to supply a lubricant to the shaft through the apertures of the shoe, hollow sleeve filter means bearing against the shaft and capable of receiving lubricant therein, the filter means comprising a diamond shaped woolen sleeve having internal spring means urging each end of the sleeve into contact with the shaft, and means connected with the said filter means to return the fluid lubricant to the supply means.

References Cited in the file of this patent

UNITED STATES PATENTS

| | | |
|---|---|---|
| 158,169 | Fryer | Dec. 29, 1874 |
| 368,937 | Flynt | Aug. 30, 1887 |
| 783,958 | Huff | Feb. 28, 1905 |
| 1,216,044 | Alexander | Feb. 13, 1917 |
| 1,757,582 | Martin | May 6, 1930 |
| 1,894,082 | Bryan | Jan. 10, 1933 |
| 2,049,225 | Ripley | July 28, 1936 |

FOREIGN PATENTS

| | | |
|---|---|---|
| 289,881 | Great Britain | May 24, 1928 |